Aug. 14, 1962  R. S. MACKAY ET AL  3,049,001
TONOMETER

Filed June 18, 1959  2 Sheets-Sheet 1

INVENTORS
ELWIN MARG
RALPH S. MACKAY
BY
ATTORNEY

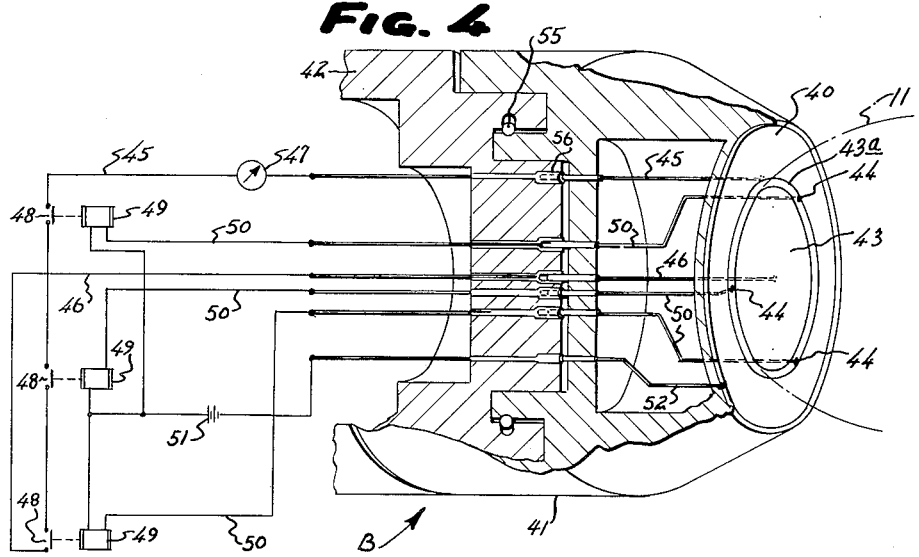
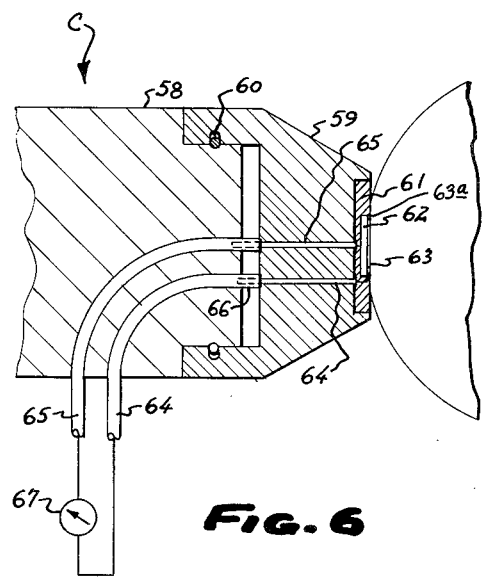

United States Patent Office 3,049,001
Patented Aug. 14, 1962

3,049,001
TONOMETER
Ralph S. Mackay, San Francisco, and Elwin Marg, Berkeley, Calif., assignors to The Regents of the University of California, Berkeley, Calif.
Filed June 18, 1959, Ser. No. 821,255
8 Claims. (Cl. 73—80)

This invention relates to improvements in measuring the internal pressure within spherical objects having a deformable wall structure. More particularly, the invention relates to an improved tonometer for rapidly and accurately measuring intraocular pressure, i.e., the pressure within a human eyeball.

Intraocular pressure is measured in the diagnosis and treatment of glaucoma, a disease characterized by abnormally high pressure within the eyeball, which, if it persists, leads to irreversible blindness. Tonometers have long been used to measure intraocular pressure, but heretofore they have been crude and relatively inaccurate instruments which could be successfully operated only by one having a high degree of skill. This limited performance of the prior-art tonometers has presented a serious problem since, without a consistently accurate tonometer, glaucoma cannot be detected in its early stages, when the intraocular pressure may have increased only slightly above normal.

To illustrate some of the serious disadvantages of the prior art devices a brief review of the classic tonometers will be made. Basically, there were two types, namely, the indentation type best exemplified by the well-known Schiøtz and Mueller tonometers and the aplanation type exemplified by the Goldman tonometer.

The Schiøtz tonometer and the Mueller tonometer both measured the actual indentation of the cornea by a plunger which was pressed under a fixed force directly against the eyeball. The patient had to be placed under anesthetic and only a highly skilled operator could successfully and safely manipulate the plunger. In the Schiøtz tonometer the indentation was read mechanically while Mueller employed an electrical detection system to determine the force of indentation. The high degree of skill required to operate the indentation type of tonometer and the obvious discomfort to the patient, which necessitates an anesthetic, are obvious disadvantages. Moreover, the indentation type of tonometer is also inherently inaccurate. They cannot ordinarily detect pressures below 5 mm. Hg. They do not directly determine the internal eyeball pressure, but the indentation, and the user has to compensate in some way for such factors as corneal elasticity, scleral rigidity, and other structural characteristics of the eyeball such as the astigmatic corneal surface and individual differences in corneal curvature. Users of indentation-type devices attempted to compensate for these factors by the use of sets of calibrated curves adapted for different plunger weights, but this indirect method of measurement has never been sufficiently accurate.

The second classic type of tonometer, that of Goldman, measured the amount of force required to flatten a given area on the surface of the eyeball. While an improvement over the indentation type, the Goldman tonometer was still inaccurate, for the unique structural factors of each individual eyeball such as corneal elasticity, surface tension of tears and disparity in eyeball shape significantly influenced the readings and led to unpredictable and uncompensatable errors, by affecting the force required to flatten the eyeball. Other disadvantages of Goldman's device are that the patient must be in an upright position and that he must be given anesthetic because it takes a long time to take a measurement by Goldman's tonometer.

The present invention has overcome the disadvantages of the classic prior-art tonometers and has solved the problem of providing a fast yet consistently accurate measurement of intraocular pressure. In the present invention a pressure sensitive electrically conductive contact material is arranged in a novel manner on a probe-like device. The probe is then pressed against the eyeball to flatten an area from which is obtained the eyeball pressure. Three basic variations of our device are described, wherein the area of pressure sensitive material is respectively greater than, equal to, and less than the area of eyeball which is flattened. Each of these variations embodies a different approach to the measuring problem, and all result in tonometers which solve the problems heretofore prevalent in prior art devices.

Our invention eliminates the extraneous error factors which heretofore prevented accurate pressure measurements. No indentation of the eyeball is necessary and the pressure measurement is obtained during a fast but light and gentle contact with the eyeball which momentarily flattens a portion of its surface. The need for calibration and other error compensating devices has been eliminated, since our invention measures directly the internal eyeball pressure.

Another advantage of our invention is that a high degree of skill is not required by an operator to achieve consistently accurate results. Thus the diagnosis and screening service can be made available to a greater number of people.

Our new tonometers rapidly obtain the eyeball pressure without the need of anesthetics, and the patient may be examined in any bodily orientation. Furthermore, the present invention requires contact on the eyeball for only about one second, as opposed to much greater times of contact on the classic tonometers heretofore used. No damage can be done to the eye during the pressure measurement even if the measurements are repeated. With the present invention contact is equally effective with all portions of the eyeball, including the cornea, and this is extremely important when corneal sensitivity is a problem.

Other objects, features and advantages of the present invention will be apparent from the following description and from the drawings in which:

FIG. 1 is a view in perspective of a tonometer embodying the principles of the present invention and being employed on a patient to measure intraocular pressure.

FIG. 2 comprises three schematic views in elevation of a tonometer and an eyeball showing the three basic forms of the invention using a pressure sensitive material pressed against an eyeball to create a flattened area thereon. In these basic forms the paint transducer area is: A—larger than, B—equal to, and C—less than the flattened area of the eyeball.

FIG. 4 is a fragmentary enlarged view in perspective and in section of an embodiment of the invention wherein the area of paint transducer is essentially equal to the flattened area of the eyeball.

FIG. 5 is a greatly enlarged view in section of pressure-sensitive paint dot shown in FIG. 4.

FIG. 6 is a fragmentary enlarged view in elevation and in section of the embodiment of our invention wherein the area of pressure sensitive paint is less than the flattened area of the eyeball.

Figure 1:

Broadly speaking, the present invention is directed to a device for rapidly and accurately measuring intraocular pressure in a human eyeball. Basically, the present invention utilizes, in three basic forms, a thin film 9 of pressure-sensitive material which is arranged in the various unique embodiments to provide a measurement of force and, in some cases, area. The pressure sensitive paint 9 is characterized by the fact that its electrical resistance changes as it is subject to increased pressure. Thus, as the thin film 9 of paint, mounted in a convenient hand held probe 10, is pressed against the cornea of the eye 11 is shown in FIG. 1, the increasing force compresses the material slightly and causes a decrease in its electrical resistance to be indicated on a meter which is electrically connected thereto.

In its physical makeup, the pressure sensitive film or paint which is employed in all forms of the invention, is a conducting powder of finely ground particles mixed with a binder that retains some flexibility on drying. The binder permits the paint material to be applied in liquid form on a desired surface and after drying, a film of finite thickness remains, which changes its electrical resistance when pressure is applied to the paint surface. We have discovered that the combination of carbon particles suspended in a binder composed of rubber latex provides a highly effective paint material for use in tonometer devices as described by our invention. However, it is possible that other pressure sensitive substances could be used.

Figure 2:
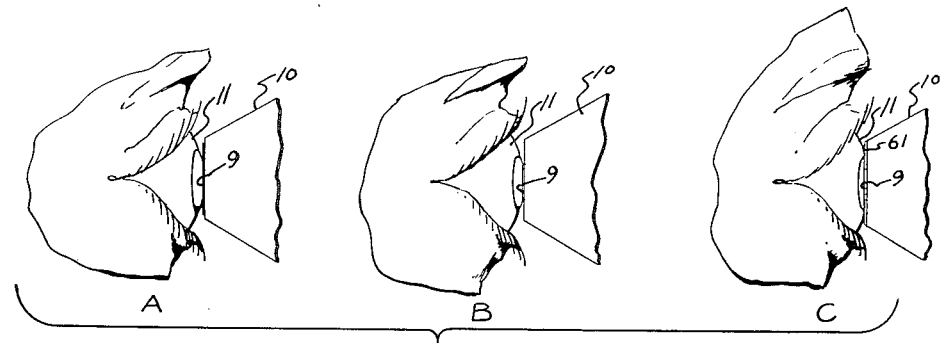

Using our discovery that pressure-sensitive paint is a highly effective transducer in determining internal eyeball pressure, three basic forms of tonometers have been devised. These will be described in the following detailed description of our invention as tonometers A, B, and C. The principal factor which differentiates the three forms of our invention, the use of pressure-sensitive paint being common to all, is the relation between the area of eyeball surface contacted and the area of the paint transducer. The area of contact of the eye with the paint can either be less than, equal to, or greater than the area of the paint spot on the base plate as shown diagrammatically in A, B, and C of FIG. 2.

*The Tonometer A Where the Area of Paint Transducer is Greater Than the Area of Contact (FIG. 2A and Fig. 3)*

The tonometer A comprises generally a probe-type instrument 10 having a main cylindrical body portion 12 threadedly attached to an end member 13 whose forward end is conveniently tapered. (The term "probe" is used in the electronic sense to describe a generally tube-like hand held instrument which carries a sensing device.) We have found it advantageous to construct the body 12 and end member 13 from a suitable solid plastic material in order to facilitate the insulation and control of the small electrical currents within the instrument and also to provide ease of fabrication. The end member 13 has a central bore 14 adapted to receive a pressure sensing core 15 which may be retained therein by a snap ring 16 in a stepped-down annular extension 17 of the body member 12. The extension 17 is bored to adjustably receive the end of the core 15 in a snug fit and a shoulder 18 provides an axial stop for the core 15.

Figure 3:
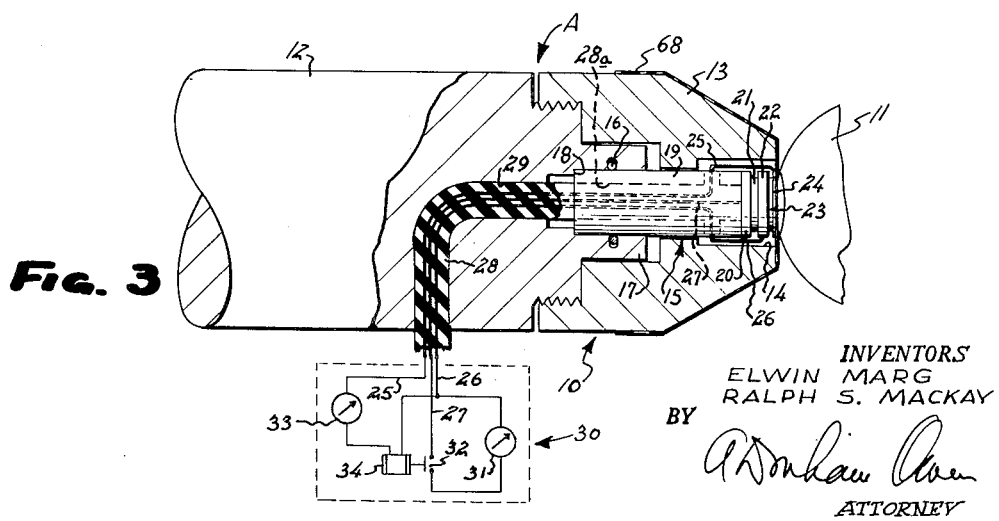
FIG. 3 is a fragmentary enlarged view in elevation and in section showing schematically an embodiment of the present invention, wherein the area of paint transducer contact is greater than the area flattened on the eye. The thicknesses of the paint areas are greatly exaggerated for purposes of clarity.

The core 15 comprises a plastic rod 19 on one end of which are mounted a unique complex of layers of conducting plates and paint transducer. Directly secured to the plastic rod 19 is a first rigid conducting plate 20, e.g., copper, on which is a first layer 21 of pressure sensitive paint. The paint layer 21 is sandwiched between the plate 20 and a second rigid conducting plate 22 made, for example, from copper. On the other side of the plate 22 is a second but thinner layer 23 of pressure-sensitive paint. The layer 23 is sandwiched between the plate 22 and an outer thin flexible film 24 of conducting material, e.g., evaporated metal which forms the pressure contact surface of the tonometer A. The film 24 may touch the eye 11 directly or a sterile sheath 68 may be used as shown in FIG. 3 and explained later on. Lead wires 25, 26 and 27 are attached respectively to the outer film 24 and to the conducting plates 22 and 20, and they extend back from the core 15 as a conduit 28 through a bore hole 28a in the rod 19 and through an aligned conduit bore passage 29 in the probe body 12. The conduit 28 extends from the main body 12 to an electrical recording device 30.

The recording device 30 receives the incoming lead wires 26 and 27 from the first and second conducting plates 20 and 22 thus connecting the plates to a source of current and an indicator, shown in combined form as a standard ohmmeter 31. The circuit through the ohmmeter 31 is initially open at a switch 32 so that no current flows before the tonometer A engages the eyeball 11. In a second circuit in the recording device 30 the leads 25 and 26 (from the outer conductive film 24 and the second conducting plate 22) are connected across a second ohmmeter 33 in series with a switching device 34, which is shown symbolically for the purposes of disclosure as a simple electrical relay. However, any type of well-known electronic switching device can be used at this point so long as it operates to close the circuit through the first ohmmeter 31 when a predetermined level of current in the lead 25 is allowed to flow.

As mentioned above, the second or outer layer 23 of pressure sensitive paint is considerably thinner than the first layer 21 of paint. In fact, the layer 23 of paint is so thin that its response when pressure is applied to it, is like that of a switch, that is, a mere on-off action instead of a linear decrease in resistance as the pressure is exerted. This nonlinear response with respect to pressure means that the outer layer 23 of pain gives only an indication of the area pushing on it, its resistance varying but only with the area upon which pressure is exerted.

The first paint layer 21, in contrast to the layer 23, is of sufficient thickness to indicate the total force applied on the paint. In other words, its resistance is inversely proportional to the applied force, and the relation is substantially linear.

To better explain this phenomenon of the pressure sensitive paint with respect to force and area, it is helpful to recall that the pressure sensitive paint is made up of conductive particles in a binder. In a thick layer of paint, many conductive particles are dispersed within the nonconductive binder and as pressure is applied and the thickness decreases, an increasing number of particles make contact and thus the overall resistance is reduced. In an extremely thin layer, however, only a small number of conductive particles are present and the biggest effect of an increase in pressure is merely to make a path for electrical current over the area where the pressure is applied.

In the present invention when the tonometer probe A is pressed against the eyeball 11, the pressure exerted flattens an area of eyeball less than the area of the end of core 15. When the pressure reaches a certain pre-set value, the switching device 34 is actuated, closing the switch 32 in the circuit through the ohmmeter 31. In effect, the signal from one transducer is stored in an indicating or memory device at a pre-set value of the signal from the other transducer. The value of the resistance indicated by the ohmmeter 31 gives an indication of the area of eyeball contact, and the reading obtained from the ohmmeter 33 gives the force applied to the eyeball. By dividing the force by the area, the pressure can be obtained.

It is not necessary that the switching be done by the circuit through the first layer 21 of paint which gives the value for total force. The arrangement can easily be reversed where the circuit through the thin layer of paint 23 will, upon reaching a predetermined value of current as its resistance is reduced, actuate a switch to close the circuit through the first layer of paint 21.

*Tonometer B, Where Area of Paint Transducer Equals the Area of Contact (FIGS. 4 and 5)*

The tonometer B utilizes an arrangement where the flattened area of the eye is just equal to the area of the paint transducer. It comprises generally a contact pressure plate 40 mounted on an end member 41 which is removably attached as by a snap ring 55 to a probe body 42. On the pressure plate 40 is located a central circular paint-transducer patch 43, which will give the force reading. Three small paint transducer areas comprising very small dots 44 of paint are also mounted on plate 40 lying close to and just beyond the periphery of the central paint area 43. These small auxiliary transducer dots 44 are activated momentarily and simultaneously just when the probe B, pressed against the eyeball 11 has flattened the eye on a circle having a diameter just including the three dots 44.

Describing now the circuitry of the "equal area" tonometer B of our invention, a lead wire 45 is attached directly to the conductive pressure plate 40 and another lead wire 46 is attached to the main central paint transducer 43. These lead wires extend to a circuit having an ohmmeter 47 and three switches 48. The switches are normally open and are closed by energization of relays 49, each of which is connected by a separate lead wire 50 to a different one of the auxiliary paint dots 44. The relays 49 are only illustrative, since again any well-known electronic switching device or coincidence circuit may be used. The auxiliary paint dot circuit includes an external source of current such as a battery 51, which is connected by a lead wire 52 to the pressure plate 40. All leads are connected from the end member 41 to the body portion 42 by well-known plug connectors 56.

As shown in FIG. 5 at each paint dot 44 the lead 50 passes through an insulator 53 in the conducting plate 40 and is attached to a conducting film 54 of evaporated metal on the outer surface of the paint dot 44. The film 54 is insulated from the plate 40 by an annular insulating ring 53a which surrounds each dot 44. With the current supplied by the battery 51 through the lead 52, a potential is thus created across the thickness of each dot 44. When the pressure plate 40 is pressed against the eyeball 11, and as each dot 44 comes in contact with the eyeball 11, the increased pressure lowers resistance in the circuit to its relay 49 allowing it to close the switch 48 in the circuit through the central paint transducer 43 which is covered with an outer conductive coating insulated from the plate 40 by an annular ring 43a and wired in the same manner as dots 44. When all the relay switches 48 are closed, the circuit through the central paint transducer 43 will be closed, and the calibrated ohmmeter 47 will indicate in terms of electrical resistance the pressure of the eyeball 11 on the pressure plate 40.

*The Tonometer C Where Area of the Paint Transducer is Less Than the Area of Contact (FIG. 6)*

In the third embodiment of the present invention shown in FIG. 6, the eye 11 is flattened to an area which completely encompasses the paint transducer.

The tonometer C comprises a body section 58 and an end member 59 which may be retained thereon in any suitable manner such as by a snap ring 60. A flat conductive pressure plate 61 is fixed to the end member 59 and a small layer or patch of paint 62 is applied to or imbedded in the plate 61. A thin film 63 of conducting material is formed over the paint layer 62 and insulated from the conductive plate 61 by an annular insulator 63a. Leads 64 and 65 are attached to the film 63 on the paint layer 62 and to the pressure plate 61, so that a small current can complete a circuit through the layer 62 of paint.

The lead wires 64 and 65 extend from the end member 59 through standard plug connections 66 to the body portion 58 and outward therefrom to an indicating device such as an ohmmeter 67. As the pressure plate 61 and the thin film of paint 63 are pressed against the eyeball 11 the pressure on the paint 63 causes a change in resistance which is indicated by the ohmmeter 67. Calibration of the ohmmeter 67 will transform the reading of resistance values to pressure.

*The protective sheath 68.*—With all of the forms of our invention no movable parts project beyond the end of the probe instrument. It is therefore possible to protect the cornea of the eye by a thin film of rubber or plastic such as a removable sheath 68 placed over the end of the tonometer. This covering provides a sterile contact for the instrument on the eye and is an advantage not found in prior art devices. After each patient the cover or sheath 68 is removed for resterilization and a different sterile sheath 68 is put on.

*Operation.*—In operation, all of the aforementioned embodiments of our invention require contact with the eyeball surface for only a relatively short period of approximately one second in order to obtain a pressure measurement. The operator, using the probe type instrument, merely applies the end of the probe 10 having the paint transducer 9 to the cornea of the eye 11 or to the white of the eye, known as the scleral conjunctiva, where an equally reliable pressure measurement can be taken.

The pressure of the probe 10 compresses the area of paint and in the case of the first embodiment shown in FIG. 3, two layers of paint 21 and 23 are utilized. The first layer 23 is mounted on the outer surface of the flat pressure plate 22 and the second layer 21 is mounted on the inside of the pressure plate 22. The first or outer layer of paint 23 is extremely thin, of the order of .001 inch thick, (this thickness may vary with the type of conductive particles used within the paint). As the probe is pressed against the eye 11, an increasing area of eyeball contacts the thin layer of paint 23 and this increased conductive area is proportional to and will thus lower the resistance of electrical current passing through the layer 23. The second and somewhat thicker layer of paint 21 mounted behind the pressure plate 22 is also compressed upon contact of the probe A with the eye 11, and the resulting decrease in resistance of this layer of paint 21 indicates the total force applied by the probe A. The switching device 34 connected to the circuit through the front transducer 23 automatically closes the circuit through the rear paint transducer 21 when a predetermined value of current is reached due to the decreasing resistance as the probe pressure is applied. Thus, a simultaneous measurement of area and force are obtained which combine to give an indication of intraocular pressure.

In the second embodiment shown in FIG. 4 the pressure of the probe B is increased until all the area-indicating dots 44 of pressure sensitive paint are contacted, at which time they energize the switches 48 to close the circuit through the central predetermined area of paint transducer 43 to measure the resistance thereof. Thus, knowing the area of the eyeball 11 contacted as that constant area encompassed by the three small dots 44, and having the simultaneous value of force as measured in terms of resistance through the central paint transducer 43, the eyeball pressure may be determined.

In the third embodiment shown in FIG. 5, the eye 11 is flattened by a pressure plate 61 to an area greater than a layer of pressure sensitive paint 62 located centrally on the pressure plate 61. The layer of paint 62 is arranged so that only the internal eyeball pressure is free to act on it and compress it. Thus, the reduction in resistance when the paint 62 is compressed, read from the connected ohmmeter 67, may be transformer directly into intraocular pressure.

From the foregoing it is apparent that our novel method and apparatus provides a greatly improved means of measuring intraocular pressure which is so vitally important to the diagnosis and treatment of ocular diseases. All of basic limitations and disadvantages of the classic tonometers in the prior art have been eliminated and the present invention now provides a way for a relatively unskilled operator to take highly accurate and consistent intraocular pressure measurements without requiring an anesthetic and without discomfort or the risk of injury to the patient's eyeball. Also, the present invention can afford a pressure reading with any orientation of the patient's head, contrary to the prior art devices.

Another advantage of the present invention is its inherent simplicity. No auxiliary devices, such as expensive slit lamps and corneal microscopes, need be employed with them. Complicated calibrations are not required periodically to compensate for differences in eyeball shape and thickness.

The present invention can be used with the patient oriented in any convenient position either supine or upright. The signal for flatness is easily checked by pushing the probe against any flat object such as a sheet of glass. Thus, the use of such equipment is within the means, skill and limitations of most refractionists. Furthermore, instruments embodying the present invention may prove of value not only in the hands of optometrists and ophthalmologists but also, since it does not require much skill, may be used generally as screening devices for detecting glaucoma.

To those skilled in the art to which this invention relates, many changes in construction and widely differing embodiments and applications of the invention will suggest themselves without departing from the spirit and scope of the invention. The disclosures and the description herein are pure illustrative and are not intended to be in any sense limiting.

We claim:

1. A device for measuring the intraocular pressure of an eyeball comprising: a probe having a body portion and a flat face at one end thereof; a conductive plate mounted on the end of said body portion; a layer of dried pressure-sensitive paint on said conductive plate comprised of a resilient binder material containing a multiplicity of finely ground conductive particles and characterized by decreasing in electrical resistance when subjected to increasing pressure; means responsive to force applied to said layer of paint when said probe is pressed against an eyeball to provide an indication of pressure within said eyeball.

2. The device described in claim 1 including in combination a sterile layer of material adapted to fit over the end of said probe to cover said contact face.

3. A device for measuring the intraocular pressure of a human eyeball comprising in combination: a probe-type instrument having a body portion with an end member having a surface adapted to contact and flatten a predetermined area on the eyeball; means for sensing the pressure by the eyeball on said end member comprising at least one layer of pressure sensitive paint material attached thereto, said layer of pressure sensitive paint comprising a multiplicity of finely ground conductive particles suspended in a flexible binder and thereby providing a change in electrical resistance in response to variable pressure applied thereto; and means to measure the resistance of said conducting material to determine the internal eyeball pressure.

4. A device for measuring the intraocular pressure of a human eyeball comprising: a probe having a body portion and an end portion adapted to contact an eyeball, said end portion having a central cylindrical bore adapted to receive a pressure transducing core member; said core member consisting of a plurality of layers of material including inner and outer flat rigid conducting plates, substantially parallel to each other, a first layer of flexible, pressure sensitive material between said conducting plates, a second layer of pressure sensitive material on the outer side of said outer conducting plate, and a thin film of conductive metal covering said second layer of pressure sensitive material, lead wires attached to said inner and outer plates and said film and extending from said probe member, the lead wires from said inner and outer plates comprising a first circuit and the lead wires from said outer plate and said film forming a second circuit; switching means in said first circuit responsive to a predetermined value of current, adapted to close said second circuit, and indicating means in said first and second circuits wherein the circuit through said first layer of pressure-sensitive material will indicate the total force being exerted to flatten the eyeball while the circuit through said second layer of pressure-sensitive material will simultaneously provide an indication in resistance proportional to the amount of eyeball area flattened, said indications being combinable to obtain the internal eyeball pressure.

5. The device as described in claim 4 wherein the second layer of pressure sensitive material is thinner than said first layer, whereby when said probe is pressed against the eyeball, the first circuit through said first layer of pressure sensitive material yields a value of total force and the second circuit through the thin second layer yields a value corresponding to the actual area of eyeball flattened.

6. A device for measuring the intraocular pressure of an eyeball comprising: a probe having a body portion and a flat contact surface at one end thereof; first and second layers of pressure sensitive material within said probe said first layer having a substantially greater thickness than said second layer; means to exert pressure on both of said layers as said probe is pressed against the eyeball; means connected to said second layers to provide an indication of the area of eyeball contacted and means connected to said first layer to provide an indication of total force of the probe being exerted against the eyeball; and means to obtain said force and area indications simultaneously.

7. A device for measuring the intraocular pressure of a human eyeball comprising: a probe-like instrument having a body portion and an end portion adapted to contact the eyeball surface; a flat conducting contact plate attached to said end portion; a plurality of dots of pressure sensitive conductive material arranged on said contact plate so as to describe the outer limits of a predetermined area, each of said dots having an electrical circuit connected to a source of power and to a separate switching means; a central layer of pressure sensitive material completely enclosed within said predetermined area described by the location of said dots; said central layer of material connected to an electrical circuit having in series a source of power, a resistance indicating means calibrated in pressure values, and a plurality of open switches each controlled by a switching means energized by said electrical circuit through said dot; whereby upon engagement of said contact plate with said eyeball, the eyeball will flatten until all of said dots are simultaneously engaged by the eyeball surface causing said switches to close the circuit through said central layer of pressure sensitive paint to provide a value of force for a predetermined amount of area.

8. A device for measuring the intraocular pressure of a human eyeball comprising a probe-like instrument comprising a body portion and an attached end member; a rigid flat base plate fixedly mounted on said end member; a layer an area of pressure-sensitive material having a predetermined area, lying completely within the area of said base plate and imbedded in the upper surface of said base plate and covered by a thin conductive film, said pressure sensitive material comprising a multiplicity of finely ground electrically conductive particles suspended in a resilient binding material, said material being characterized by a change in electrical resistance when subjected to external pressure; means for passing a current through and thereby measuring the resistance of said layer of pressure-sensitive material when said eyeball is flattened to an area greater than that of said pressure-sensitive material by said base plate, said resistance being calibrated in terms of pressure.

References Cited in the file of this patent

UNITED STATES PATENTS

| | | |
|---|---|---|
| 1,448,681 | Stoekle | Mar. 31, 1923 |
| 2,472,045 | Gibbons | May 31, 1949 |
| 2,831,478 | Uddenberg et al. | Apr. 22, 1958 |
| 2,959,056 | Traite et al. | Nov. 8, 1960 |

UNITED STATES PATENT OFFICE
CERTIFICATE OF CORRECTION

Patent No. 3,049,001 August 14, 1962

Ralph S. Mackay et al.

It is hereby certified that error appears in the above numbered patent requiring correction and that the said Letters Patent should read as corrected below.

Column 3, line 18, for "is" read -- as --; column 6, line 74, for "transformer" read -- transformed --; column 8, line 68, strike out "an area".

Signed and sealed this 27th day of November 1962.

(SEAL)
Attest:
ESTON G. JOHNSON
Attesting Officer

DAVID L. LADD
Commissioner of Patents